Sept. 4, 1928.
H. C. REMMERS
1,683,411
PORTABLE TRACTION DEVICE
Filed Aug. 13, 1926    2 Sheets-Sheet 1
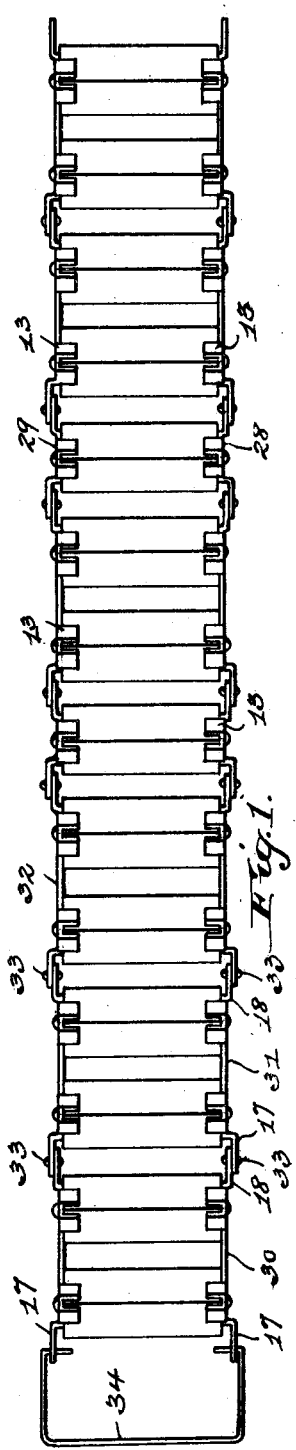
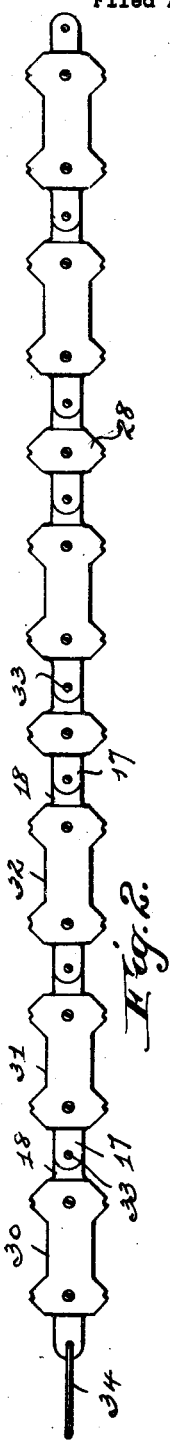
INVENTOR.
Harry C. Remmers
By
Charles B. Harry Jr.
ATTORNEY.

Sept. 4, 1928.
H. C. REMMERS
PORTABLE TRACTION DEVICE
Filed Aug. 13, 1926
1,683,411
2 Sheets-Sheet 2
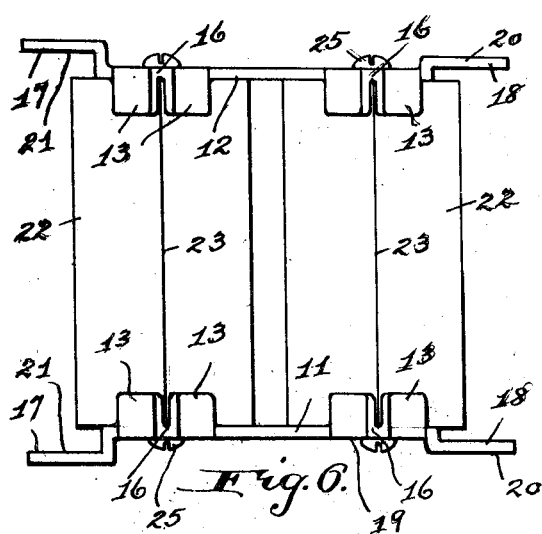
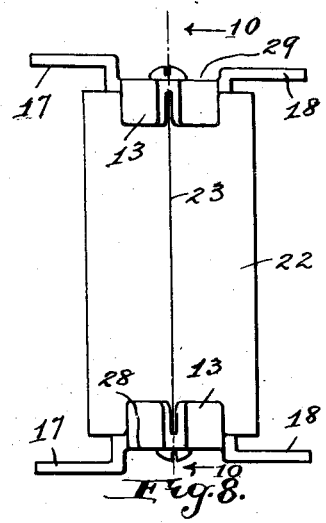
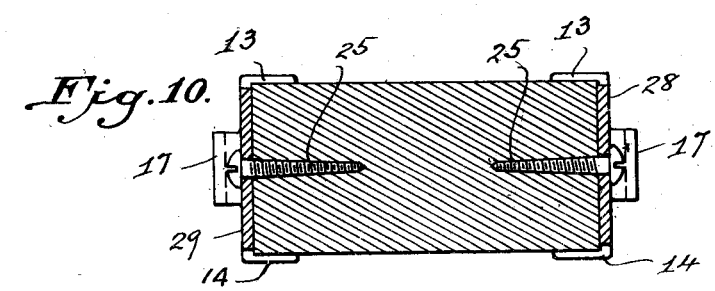
INVENTOR.
Harry C. Remmers
BY
Charles B. Many Jr.
ATTORNEY.

Patented Sept. 4, 1928.

1,683,411

UNITED STATES PATENT OFFICE.

HARRY C REMMERS, OF BALTIMORE, MARYLAND, ASSIGNOR TO HENRY GOODMAN, OF BALTIMORE, MARYLAND.

PORTABLE TRACTION DEVICE.

Application filed August 13, 1926. Serial No. 129,036.

This invention relates to an improved portable traction device for use in connection with motor-vehicles to facilitate traction when the wheel or wheels of the vehicle is or are in mud, sand or snow.

The device of the invention is especially useful in facilitating the extrication of one or both of the power wheels of an automobile from mud holes, loose earth, sand or snow, which operation is frequently accomplished only after the expenditure of considerable time and ingenuity.

Some of the objects therefore of the present invention are to provide a device which may readily be carried on the automobile and stowed away thereon and which can quickly and conveniently be placed in position adjacent to the wheel or wheels so that the wheel when rotated will immediately be engaged in order that it may advance the vehicle.

Another object of the invention is to provide a traction device which shall be capable of flexion when the wheels of the vehicle ride thereon but which will be sufficiently stiff to enable it to be tucked down in the mud or in a hole and under the wheel where the wheel will engage it when revolved.

Flexible traction mats have heretofore been proposed but my experience has taught me that considerable difficulty would be experienced in forcing the ends of those flexible devices down under the wheel where the latter can engage it and in many instances, if the revolving wheel does engage the mat, if the latter is in loose dirt or mud, the revolution of the wheel simply carries the mat under and beyond the wheel without advancing the vehicle.

My experience has indicated to me that in many instances the conditions of the road or the surface under the wheel is such that it is as important to provide a structure that will engage the road as readily as it may itself be engaged by the wheel and the present invention includes a construction that provides this double engagement.

Another object is to provide an improved construction of traction device which may be folded with one end overlying the other or which will permit two of the devices to be laid on the roadway, one on top of the other, which folded or superposed devices will engage each other to prevent the displacement of one with respect to the other.

With the above and other objects in view, the invention is illustrated in the accompanying drawings wherein,—

Fig. 1 shows the complete device laid out flat and in top view.

Fig. 2 illustrates the same in side elevation.

Fig. 3 shows the device in side elevation with one end folded over to produce a double-thickness at one end.

Fig. 4 illustrates one of the detached double link-plates in side elevation.

Fig. 5 shows one of the detached single link-plates in side elevation.

Fig. 6 illustrates a double-link section in top view.

Fig. 7 shows the same in side elevation.

Fig. 8 illustrates a single link-section in top view.

Fig. 9 shows the same in side elevation.

Fig. 10 illustrates a cross-sectional detail through the link-plates and the block showing the same as it would appear if viewed on the line 10—10 of Fig. 8, and Fig. 11, shows a wheel of a vehicle and the improved device on the ground beneath the wheel,—the latter riding thereover.

Referring to the drawings and particularly to Figs. 4 to 10 inclusive the parts which form the link sections are shown.

In the present instance these link-sections are formed in what I term double and single links because I have found in practice that advantages are gained by the use of a combination of these two kinds of links over a structure where all single or all double links are used.

In Figs. 4—6 and 7 a double link-section is illustrated, and by reference thereto it will be noted that this section has two side plates 11 and 12 and that each plate has inturned or laterally-projecting top and bottom flanges 13 and 14. These inturned flanges form top and bottom V-shaped recesses at the inner sides of the link plates and about midway between the upper and lower flanges each plate has a hole or perforation 15, extending entirely therethrough.

By preference, the top and bottom flanges are formed in pairs,—the two flanges of each pair being reversely inclined and having a notch or concavity 16 in the angle between the two lugs. These notches or concavities serve a useful purpose in the operation of the device as will presently be explained.

One end of each link-plate 11 or 12, has a longitudinally-extending pivot-lug 17, while the opposite end of the same link-plate has another longitudinally-extending pivot-lug 18. By reference to Fig. 6, it will be seen that these two opposite end pivot-lugs 17 and 18 are off-set outwardly with respect to the vertical side face 19 of the link-plates and also that the lug at one end has a greater off-set than the lug at the opposite end. In fact, the off-setting of the lugs is such that the lug at one end, say lug 18, has its outer side face 20 in a vertical plane that will pass along the inner vertical side 21 of the lug 17 at the opposite end.

The purpose of thus arranging the two end lugs 17—18 is to enable the lugs 17 on the ends of one link-section to lap the lugs 18 on the end of another link-section and the two lapped lugs then be pivotally connected as and for a purpose presently to be explained.

Between the two link-plates 11 and 12, I provide cross-blocks 22. These blocks are preferably rectangular in cross-section and are so disposed between the plates that their ends will enter the recesses at the inner sides of the plates that are formed by the inturned top and bottom lugs 13 and 14.

The lugs 13 and 14 therefore engage the flat side faces of the blocks 22 and sustain those blocks between the two link-plates 11 and 12 with one angular edge 23, of each block extending horizontally across the top and the diagonally-opposite edge 24 of each block extending horizontally across the bottom so that sharp angular edges of the blocks will be exposed at the upper and lower sides of the link-sections.

The cross-blocks 22 are secured in place between the link-plates 11 and 12 by means of fastenings that extend longitudinally in the blocks and pass through the holes or perforations 15 in the link-plates. In the present instance these fastenings are shown as screws 25.

Each of the pivot-lugs 17—18 has a perforation 26, through which a pin or rivet 27 may be passed so as to pivotally connect one link-section with another.

In Figs. 5, 8 and 9, I show a single link section wherein the side plates 28 and 29 have the upper and lower inturned flanges 13 and 14 and the longitudinal pivot-lugs 17 and 18 to engage the cross-block 22, precisely as in the double-link section. The block 22 is also secured by the fastenings 25 as in the double-link section.

After the link-sections have been separately formed with the blocks in place, I proceed to assemble the sections and to pivotally connect one section with another.

I have found in practice that advantages are gained if two or three of the link sections at the end of the assembled structure are so riveted that they will pivot under pressure but will not swing or pivot under their own weight.

For example, in Figs. 1—2 and 3, I show three double-link end sections 30—31 and 32, whose pivot lugs 17—18 are united by rivets 33. These rivets 33, in practice, are swaged down with sufficient force to make a stiff joint between the sections 30 and 31 and the sections 31 and 32 so that if the device is lifted by the section 32 the sections 31 and 30 will not swing down by their weight, but if laid on uneven ground the wheel of an automobile, when riding thereon, will cause the three end sections to pivot, one with respect to the other.

The purpose of these stiff joints between these end sections is, as explained, to keep those three sections normally in alinement during the handling of the device so that this stiff or comparatively rigid end may be used as the end which is to be forced or tucked down under the wheel which latter may be in soft earth or mud.

If these end sections are loosely pivoted together, obviously the end-most section would have to be engaged when forcing it down in the mud under a wheel with the result that the hands of the operators would also have to be forced down in the mud to place the end-most section in position under the wheel.

By thus making several of the end sections comparatively rigid the second or third section may be grasped by the hands and the end tucked under the wheel in the mud without also putting the hands in the mud.

By interposing a plurality of single links in the length of the device, greater flexibility is provided and the structure may be more compactly folded as indicated in Fig. 3.

There are times when a rut or hole may be such that a double-thick structure would be desirable and in such instance one end of the device may be folded over onto the remainder and laid thereon so that the notched edges 16 will interlock and prevent the folded-over portion from sliding as the wheel rolls thereon.

For convenience in carrying, I provide a bail 34 which may be sprung into engagement with the end-most lugs 17 and the entire device may then be folded substantially midway between its ends and readily carried or placed under the seat or in the tool-box of the automobile.

When the device is laid upon the ground with one end tucked under the automobile wheel until in contact with the tread, the sharp angular upper edges 23 of the spaced blocks form the traction elements for engagement with the wheel while the sharp angular lower edges 24 of the blocks dig into the ground or mud.

The notched edges 16 of the side metal plates at the angle between the lugs 14 are comparatively sharp and when laid upon ice or snow will dig in when the weight of the vehicle is on the upper side of the device and prevent the latter from slipping.

The cross-bars or blocks 22 may be formed of any suitable material such as wood or metal and may be hollow or solid.

As the wheel of the vehicle engages the cross-bars or blocks when advancing thereover, its tendency is to depress each block as it engages it and by reason of the pivot link connections between the sections, the depression of one block or one end of a section tends to tilt the next block or the next section up toward the wheel-tread where it may be more readily engaged by the wheel.

This operation is brought about by the fact that the block or blocks of each section are carried by rigid side bars with fore and aft projecting pivot lugs which pivotally engage similar lugs on the next adjacent sections and the result is that the depression of one section by the vehicle wheel tends to lift the next section where it will more readily be engaged by the wheel.

Having described my invention, I claim,—

1. A traction device comprising a plurality of cross-bars with link plates secured at opposite ends of said bars said link-plates projecting fore and aft with respect to said bars and means for pivotally connecting the ends of one link-bar with the ends of the bars at the front and rear thereof.

2. A traction device comprising a plurality of cross-bars with link-plates secured at opposite ends of said bars said link-plates having ends that lap one with another and said lapped link-plate ends being pivotally connected.

3. A traction device comprising two stretches of pivotally-connected link-plates and a series of cross-bars fitting between the two stretches of pivotally-connected link-plates and carried by said plates.

4. A traction device comprising two stretches of pivotally-connected link-plates each having socket means on its inner side and cross-bars having their ends entering the said socket-means on and extending crosswise between the two stretches of link-plates.

5. A traction device comprising two stretches of pivotally-connected link-plates some of said plates being longer than others and cross-bars fitting between the two stretches of link-plates and having their ends attached to said plates the longer link-plates each carrying more cross-bars than the shorter link-plates.

6. A traction device comprising two stretches of pivotally-connected link-plates with a series of spaced-apart cross-bars between and carried by said plates and the link-plates at one end of the traction device having their pivot means sufficiently stiff to prevent them from swinging under their own weight.

7. A traction device comprising two stretches of pivotally-connected link-plates each plate having inturned lugs at its upper and lower edges said lugs being arranged to form V-shaped upper and lower recesses and cross-bars having V-shaped upper and lower edges said cross-bars having their ends seated in the V-shaped recesses of the link-plates.

8. A traction device comprising two stretches of pivotally-connected link-plates each plate having inturned lugs at its upper and lower edges said lugs being arranged to form V-shaped upper and lower recesses, cross-bars between the two stretches of links and having V-shaped upper and lower edges said cross-bars having their ends fitting in the V-shaped recesses and means extending longitudinally into the cross-bars and engaging the link-plates to hold the bars and plates together.

In testimony whereof I affix my signature.

HARRY C. REMMERS.